May 15, 1923.
E. E. BROWN
FLEXIBLE COUPLING
Filed Aug. 30, 1922
1,455,425
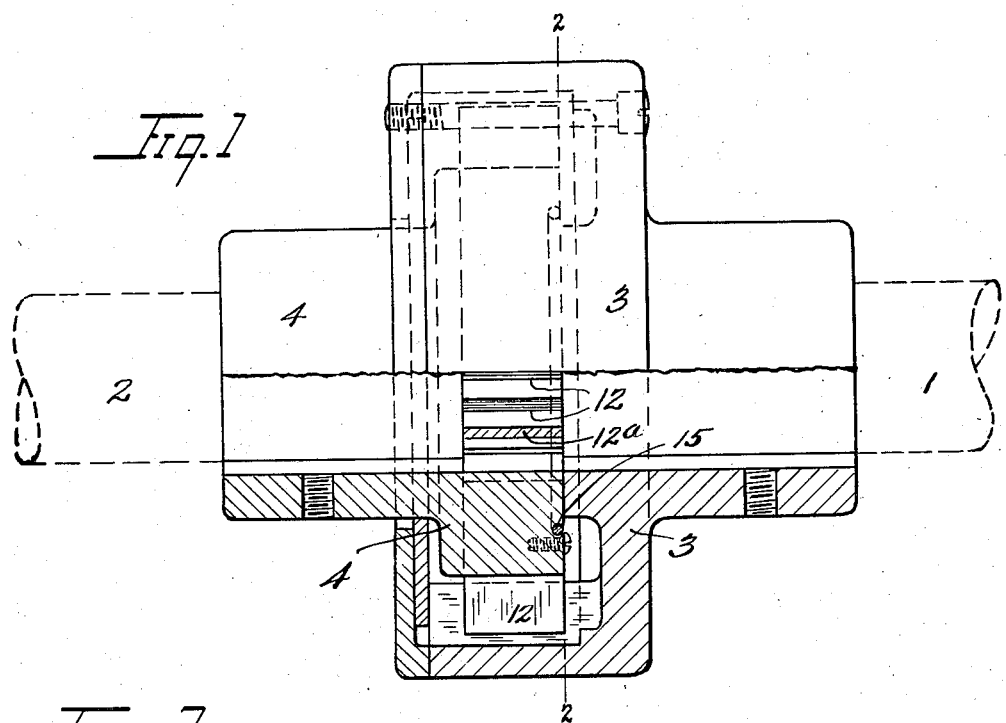
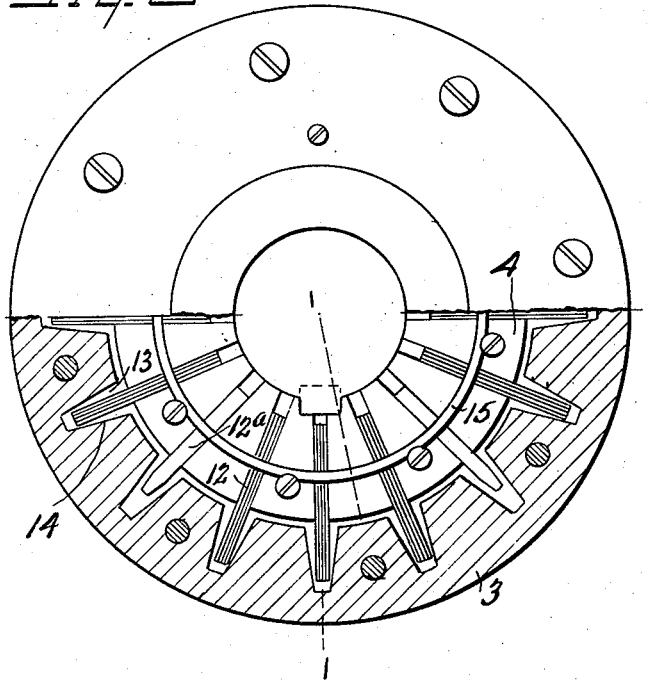
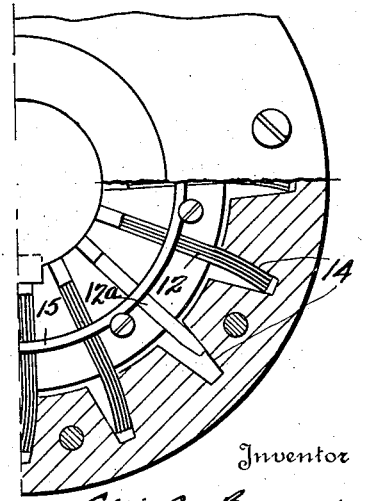
Inventor
Ellis E. Brown Patented May 15, 1923.

1,455,425

UNITED STATES PATENT OFFICE.

ELLIS E. BROWN, OF SPRINGMONT, PENNSYLVANIA.

FLEXIBLE COUPLING.

Application filed August 30, 1922. Serial No. 585,155.

*To all whom it may concern:*

Be it known that I, ELLIS E. BROWN, a citizen of the United States, residing at Springmont, in the county of Berks and State of Pennsylvania, have invented certain new and useful Improvements in Flexible Couplings, of which the following is a specification.

My invention relates to flexible couplings in which a limited relative movement of the driving and driven members is provided for to avoid the objectionable shocks incident especially to starting and stopping.

The essential purpose of the present improvement is to provide in connection with the yielding engaging means employed to permit of such relative movement of the driving and driven members, supplementary engaging means adapted to operate only in case excessive strains are brought upon the yielding engaging means; and the invention is particularly set forth by application thereof to the type of flexible coupling set forth in my Patent No. 1,328,366 of Jan. 20, 1920, as illustrated in the accompanying drawings, the novel features being clearly defined in the subjoined claims.

Fig. 1 is a side elevation partly in section, on the line 1—1 of Fig. 2, of a flexible coupling similar to that of my prior patent referred to and embodies my present invention; certain of the teeth being shown in cross-section.

Fig. 2 is an end view partly in section on the line 2—2 of Fig. 1, showing the driving and driven members in unstressed relation; and Fig. 3 is a similar view showing the yielding engaging means flexed so as to bring the supplemental engaging means into action.

As shown, the driving and driven members 3 and 4, which are fixed respectively to opposed shaft ends 2 and 1, are provided with a yielding engaging means as in my prior patent referred to; the member 4 being provided with radially arranged laminated springs 12, which are rigidly fitted in radial slots in said member with projecting portions thereof arranged to serve as resilient teeth adapted to enter tooth recesses 13 in the outer member 3 and provide a yielding driving connection between said members. Each of these tooth recesses 13 is of tapered form, providing an inclined wall 14 which at first contacts only with the outer extremity of the engaged tooth 12 and permits bending of the laminated tooth structure under operating strains as indicated in Fig. 3. As shown these teeth are conveniently held in open slots of the member 4 by a retaining ring 15, but the construction so far described is essentially the same as set forth in said prior patent.

In my improved construction I provide for avoiding possible excessive and destructive strains upon the yielding teeth 12, while retaining the full benefit of their resilient action in absorbing shocks within a range incident to ordinary operation; this being accomplished in a simple and satisfactory manner by substituting for certain of the resilient laminated teeth 12, relatively rigid teeth 12$^a$ made of solid steel bars similarly fitted to and retained in the radial slots of said member 4; these rigid teeth 12$^a$ extending only part way into the tapered recesses 13 of the outer member 3 as indicated, and being correspondingly tapered at their ends so as to be normally free of contact with the walls of said recesses as indicated in Fig. 2, but coming into contact with the inner portions of said walls only in case the strains upon the laminated-spring teeth 12 have caused a determined maximum flexure of the latter as indicated in Fig. 3. If excessive strains occur from any cause they are thus taken by these rigid substitute teeth 12$^a$, and at a point close to their support in the slotted member 4 so as to carry approximately the shearing strength of their material, thereby safe-guarding the laminated spring teeth 12 against destructive strains while at the same time always utilizing their resiliency to the determined maximum safely permissible. The direction of rotation may obviously be reversed without affecting the described operation.

What I claim is:

1. A flexible coupling comprising driving and driven members, one of which is formed with circularly spaced tooth recesses, and the other of which is provided with engaging teeth some of which are of resiliency yielding structure and other of relatively rigid structure, the latter being adapted to engage only after determined flexure of the resilient teeth.

2. A flexible coupling comprising driving and driven members one of which is formed with circularly spaced tapered recesses and the other of which is provided with radial engaging teeth; some of said teeth being of laminated spring structure having end portions adapted to engage at the narrowed portions of said recesses, and others thereof being relatively rigid and adapted to engage at the widened portions of said recesses after determined flexure of said laminated spring teeth.

3. A flexible coupling comprising driving and driven members, one of which is formed with circularly spaced tooth recesses, and the other of which is provided with radial engaging teeth some of which are of laminated spring structure adapted to resiliently bend under strain and others of which are formed of solid bars; the latter being adapted to engage only after determined flexure of said resilient teeth.

In testimony whereof I affix my signature.

ELLIS E. BROWN.